(12) United States Patent
Hamilton, II et al.

(10) Patent No.: US 9,727,934 B2
(45) Date of Patent: *Aug. 8, 2017

(54) SYSTEM AND METHOD FOR AVOIDING DUPLICATION OF EFFORT IN DRAFTING DOCUMENTS

(71) Applicant: INTERNATIONAL BUSINESS MACHINES CORPORATION, Armonk, NY (US)

(72) Inventors: Rick A. Hamilton, II, Charlottesville, VA (US); Paul A. Moskowitz, Yorktown Heights, NY (US); Clifford A. Pickover, Yorktown Heights, NY (US); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/548,627

(22) Filed: Nov. 20, 2014

(65) Prior Publication Data

US 2015/0081573 A1    Mar. 19, 2015

Related U.S. Application Data

(63) Continuation of application No. 12/362,753, filed on Jan. 30, 2009, now Pat. No. 8,943,033.

(51) Int. Cl.
*G06Q 50/18*      (2012.01)
*G06F 17/30*      (2006.01)

(52) U.S. Cl.
CPC ..... *G06Q 50/184* (2013.01); *G06F 17/30011* (2013.01); *G06F 17/30684* (2013.01);
(Continued)

(58) Field of Classification Search
CPC ............ Y10S 707/925; Y10S 707/927; Y10S 707/934; G06F 17/30011; G06F 17/30684; G06F 2216/11; G06Q 50/184
(Continued)

(56) References Cited

U.S. PATENT DOCUMENTS 5,999,907 A    12/1999 Donner
6,018,714 A    1/2000 Risen, Jr. et al.
(Continued)

OTHER PUBLICATIONS

User's Manual for the Examiners Automated Search Tool (EAST) 2.1, Document Version 1.3, May 5, 2006, 256 pages.*
(Continued)

*Primary Examiner* — Kris Mackes
*Assistant Examiner* — Tiffany Bui
(74) *Attorney, Agent, or Firm* — Christopher K. McLane; Andrew M. Calderon; Roberts Mlotkowski Safran Cole & Calderon, P.C.

(57) ABSTRACT

A system and method is provided for avoiding duplication of effort in drafting documents and, in particular, to a system and method for avoiding duplication of effort in preparing patent related submissions. The method is implemented on a computer infrastructure comprises storing disclosure information related to non-public proprietary innovation and receiving terms associated with an innovation. The method further comprises matching the terms with the stored disclosure information and providing an alert to a user that certain of the terms overlap with the stored disclosure information.

19 Claims, 3 Drawing Sheets

(52) U.S. Cl.
CPC ....... *G06F 2216/11* (2013.01); *Y10S 707/924* (2013.01); *Y10S 707/925* (2013.01); *Y10S 707/927* (2013.01); *Y10S 707/934* (2013.01)

(58) Field of Classification Search
USPC .................................................. 707/923–938
See application file for complete search history.

(56) References Cited

U.S. PATENT DOCUMENTS

| | | | |
|---|---|---|---|
| 6,968,332 B1 * | 11/2005 | Milic-Frayling | G06F 17/30867 |
| | | | 707/723 |
| 7,010,701 B1 | 3/2006 | Bossemeyer et al. | |
| 7,076,439 B1 | 7/2006 | Jaggi | |
| 7,089,192 B2 | 8/2006 | Bracchitta et al. | |
| 7,127,405 B1 | 10/2006 | Frank et al. | |
| 7,386,460 B1 * | 6/2008 | Frank | G06Q 10/10 |
| | | | 705/310 |
| 7,797,373 B1 | 9/2010 | Berger | |
| 8,095,581 B2 | 1/2012 | Stobbs et al. | |
| 8,103,709 B1 | 1/2012 | Lee | |
| 8,290,958 B2 | 10/2012 | Boone et al. | |
| 2002/0065848 A1 * | 5/2002 | Walker | G06F 17/24 |
| | | | 715/205 |
| 2002/0161733 A1 | 10/2002 | Grainger | |
| 2003/0028651 A1 * | 2/2003 | Schreckengast | G06F 21/10 |
| | | | 709/229 |
| 2003/0046307 A1 | 3/2003 | Rivette et al. | |
| 2004/0073443 A1 * | 4/2004 | Gabrick | G06F 17/30011 |
| | | | 705/310 |
| 2004/0125402 A1 | 7/2004 | Kanai et al. | |
| 2004/0158587 A1 | 8/2004 | Shay et al. | |
| 2006/0041597 A1 * | 2/2006 | Conrad | G06F 17/30864 |
| | | | 707/999.2 |
| 2006/0059413 A1 | 3/2006 | Tran | |
| 2007/0005595 A1 | 1/2007 | Gafter | |
| 2007/0136321 A1 | 6/2007 | Allen et al. | |
| 2007/0220041 A1 | 9/2007 | Van Luchene et al. | |
| 2007/0220042 A1 | 9/2007 | Mueller et al. | |
| 2007/0220614 A1 | 9/2007 | Ellis et al. | |
| 2008/0091750 A1 | 4/2008 | Zadrozny et al. | |
| 2008/0097936 A1 | 4/2008 | Schmidtler et al. | |
| 2008/0104408 A1 | 5/2008 | Mayer | |
| 2008/0195604 A1 | 8/2008 | Sears | |
| 2008/0201159 A1 | 8/2008 | Gabrick et al. | |
| 2008/0250021 A1 | 10/2008 | Boys et al. | |
| 2008/0313528 A1 | 12/2008 | Chang et al. | |
| 2009/0016615 A1 | 1/2009 | Hull et al. | |
| 2009/0185223 A1 | 7/2009 | Kanai et al. | |
| 2009/0198584 A1 | 8/2009 | Sorensen et al. | |
| 2010/0057483 A1 | 3/2010 | Peterson | |
| 2010/0057629 A1 | 3/2010 | Markowitz | |
| 2010/0125566 A1 | 5/2010 | Gibbs et al. | |
| 2012/0016859 A1 | 1/2012 | Sears | |
| 2013/0117039 A1 | 5/2013 | Washburn et al. | |

OTHER PUBLICATIONS

IEEE explore 2008 documents, Copyright 2008 IEEE. pp. 1-26.
U.S. Patent and Trademark Office Manual of Patent Exmining Procedure by MAgdalen Y.C. Greenlief, Revision No. 5, Aug. 2006, 7 pages.
Besaha, "Bounty Hunting in the Patent Base", Communications of the ACM, Mar. 2003, vol. 46, No. 3, pp. 27-29.
Iwayama et al., "An Empirical Study on Retrieval Models for Different Document Genres: Patents and Newspaper Articles", SIGIR '03, Jul. 28-Aug. 1, 2003, pp. 251-258.

* cited by examiner

SYSTEM AND METHOD FOR AVOIDING DUPLICATION OF EFFORT IN DRAFTING DOCUMENTS

FIELD OF THE INVENTION

The invention generally relates to a system and method for avoiding duplication of effort in drafting documents and, in particular, to a system and method for avoiding duplication of effort in preparing patent related submissions.

BACKGROUND

Many companies such as, for example, International Business Machines Corporation, encourage innovation. For example, in encouraging innovation, these companies support patent development programs with their employee base. These patent development programs include, for example, corporate wide invention programs that provide tools and resources for the employee base to be successful innovators and hence, patent holders. These resources, for example, include standardized tools to complete patent submissions such as, for example, standardized patent disclosure forms.

SUMMARY

In a first aspect of the invention, a method implemented on a computer infrastructure comprises storing disclosure information related to non-public proprietary innovation and receiving terms associated with an innovation. The method further comprises matching the terms with the stored disclosure information and providing an alert to a user that certain of the terms overlap with the stored disclosure information.

In another aspect of the invention, a computer program product comprises a computer usable storage medium having readable program code tangibly embodied in the storage medium. The computer program product is operable to: compare disclosure documents stored in a database with terms provided by a user; and provide an alert of matching technology within the disclosure documents and the terms by displaying at least one section of the matching disclosure documents.

In another aspect of the invention, a system comprises a computer infrastructure and computer instructions tangibly embodied on storage medium. The computing instructions comprises: first instructions operable to store disclosure documents related to technology evaluation; second instructions operable to receive terms associated with an innovation of a third party; third instructions operable to parse the terms with the disclosure documents; and fourth instructions operable to display at least one of a title and abstract of the stored disclosure documents that are associated with the terms found during the parsing. The first, second, third and fourth instructions are stored on the storage media.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
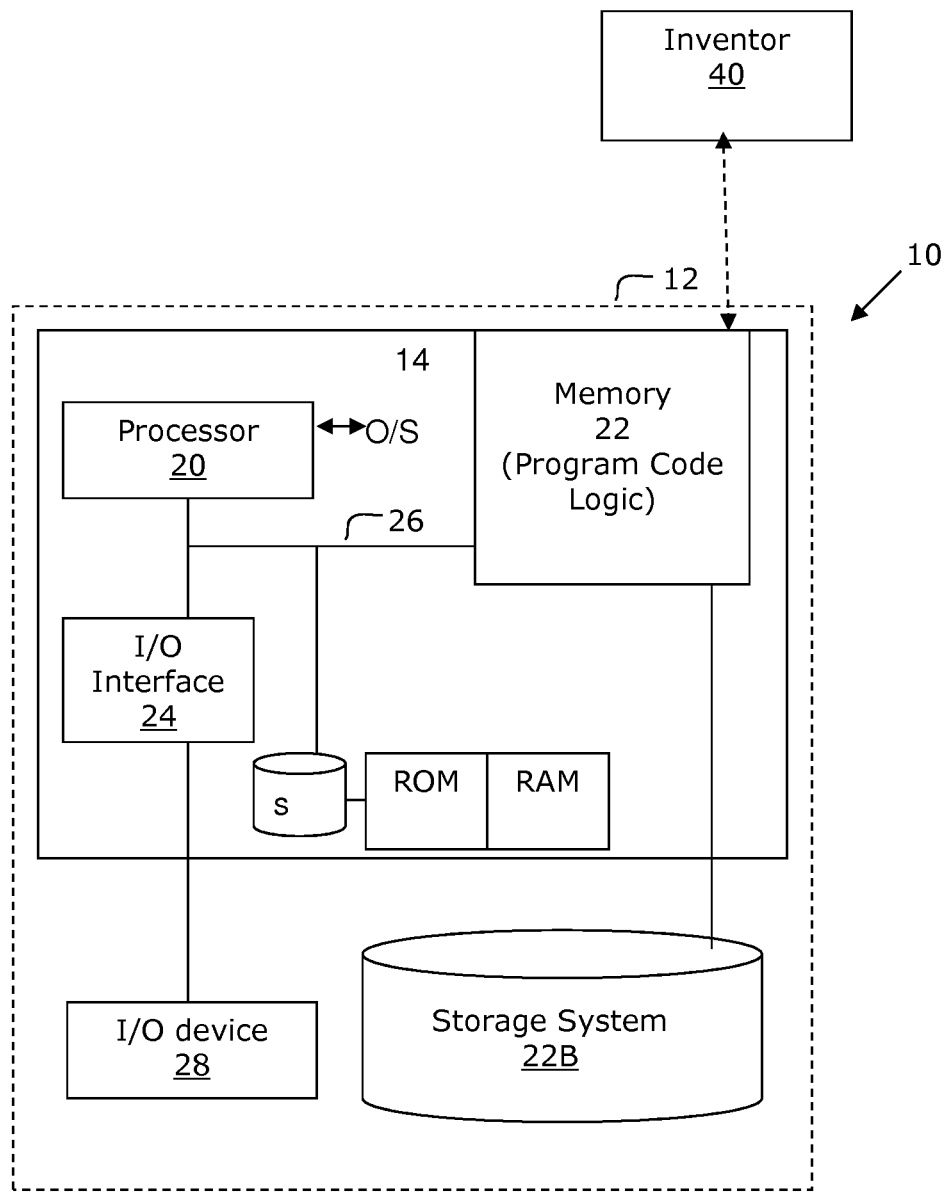
FIG. 1 shows an illustrative environment for implementing processes in accordance with the invention.

The invention generally relates to a system and method for avoiding duplication of effort in drafting documents and, in particular, to a system and method for avoiding duplication of effort in preparing patent related submissions. More specifically, the system and method of the present invention is configured to alert an inventor that a potential overlap (or no overlap) exists with previously submitted disclosures and/or patent applications. Also, the system and method of the present invention allows new inventors to investigate internal disclosure submissions in order to determine whether the subject of interest has already been addressed in one or more previous disclosure submissions. In this way, the invention provides an automated and computerized method and system to assist inventors with the discovery of overlapping disclosures and/or innovations with respect to new invention ideas.

Advantageously, the system and method of the present invention is more efficient than currently known methods and systems. For example, the system and method of the present invention provides a great deal of time savings to both new inventors and those responsible for processing disclosure submissions. Also, the present invention can be implemented with existing patent tracking tools.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++, for example, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

More specifically, FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be any computing device which is capable of performing the processes described herein. The computing device 14 includes the computer program code (program control) configured to make computing device 14 operable to perform the services described herein. In more particularity, the program control provides an efficient way in which to track invention disclosures and, in particular, provides a system and method for efficiently allowing inventors to review certain portions of previously submitted invention disclosures.

In an aspect of the invention, the system and method provides a mechanism for the "progressive" release of information. This may be of value in situations when an invention disclosure, for example, is in not yet fully written. For example, the progressive release of information gives the authors of an "existing invention disclosure" the ability to reveal information about their disclosure in a progressive fashion without revealing the entirety of the writing, e.g., "everything" about the invention. This can be achieved using metadata tags, in one example. Such tags may also be of use to easily specify reuse of a section of a disclosure, e.g. a standard kind of diagram that may be used by other inventors. The progressive release of information can be used to provide alerts to inventors. The alert includes progressively displaying sections of disclosure information which overlap with the terms associated with an invention.

The computing device 14 includes a processor 20, a memory 22A, an I/O interface 24, and a bus 26. The processor 20 executes the program control, which is stored in the memory 22A and/or storage system 22B as one or computing modules. While executing the program control, the processor 20 can read and/or write data to/from the memory 22A, storage system 22B, and/or I/O interface 24. The storage system 22B can be any searchable database that stores preexisting invention disclosure documents. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU. The bus 26 provides a communications link between each of the components in the computing device 14.

The computing device 14 is in communication with an external I/O device/resource 28. The external I/O device 28 can comprise any device that enables an individual to interact with the computing device 14 and more specifically the storage system 22B. Specifically, the external I/O device 28 may be, for example, a computing system that comprises a keyboard, display and mouse. In this way, the external I/O device 28 can provide an inventor 40 with an invention submission template, as well as a tool to search for previous submissions in the storage system 22B. The searchable template may include, amongst others fields:

Title
Abstract
Preferred Embodiment/Invention Detail
Alternate Embodiments
Tables and Figures
Claims In embodiments, prior to an inventor entering a new submission, the inventor can request information from the database via use of the template. For example, in embodiments, the system and method would allow the inventor to search in the "Title of Invention" field, and the "Abstract" or "Summary of Invention" fields, prior to enabling access to the remainder of the fields.

More specifically, since the content of a disclosure is private, current patent tools do not allow inventors to search and view disclosures written by other inventors. However, in operation, the system and method of the present invention would enable an inventor to search on the "Title" and "Abstract" fields (or "Summary of Invention" field) of the storage system 22B. In embodiments, the "Title" and "Abstract" fields (or "Summary of Invention" field) would be configured as globally readable, where the remaining core details and claims of the disclosures stored therein would continue to be private. By allowing search of titles and abstracts, for example, the inventor can gain the knowledge with respect to whether or not their current innovative idea has already been submitted by other inventors, thus saving time and effort involved in researching, writing, submitting, and defending the idea. Additionally, by reading existing titles and abstracts, the inventor may also be encouraged to think of a new or different way to accomplish the potential idea thus providing the company with additional coverage in a particular area of art. In further embodiments, the inventor may request additional information from the inventors of the previously submitted disclosure, or from other third parties as discussed in more detail with reference to FIG. 3.

The computing device 14 can comprise any general purpose computing article of manufacture capable of executing the computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. The customers may be, for example, a corporation with an existing or burgeoning patent portfolio or patent development program. In return, the service provider can receive payment from the customer(s) under a subscription and/or fee agreement and/or the service provider can receive payment from the sale of advertising content to one or more third parties.

Exemplary Processes

Figure 2:
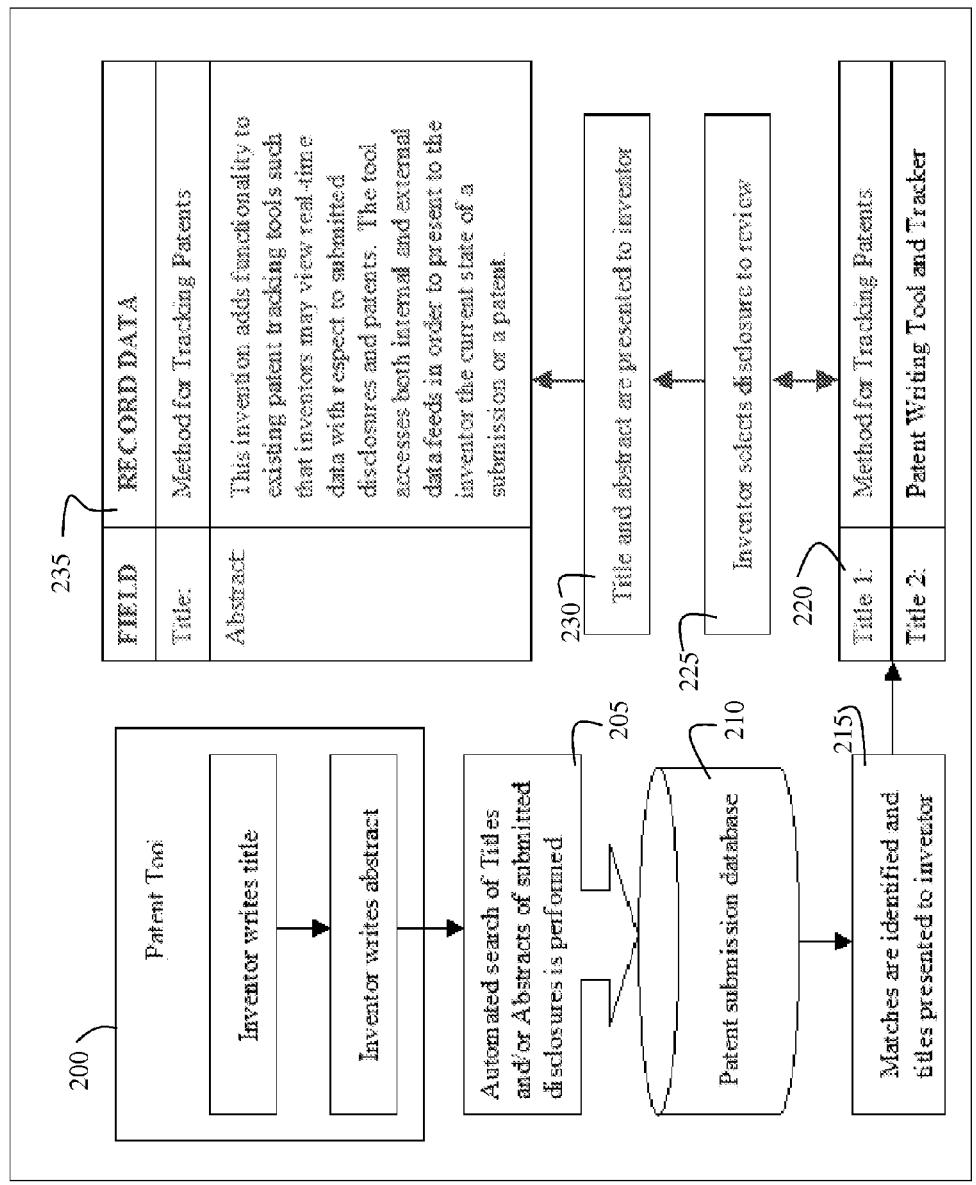
FIG. 2 is a flow diagram showing a process for searching information in accordance with aspects of the present invention.
Figure 3:
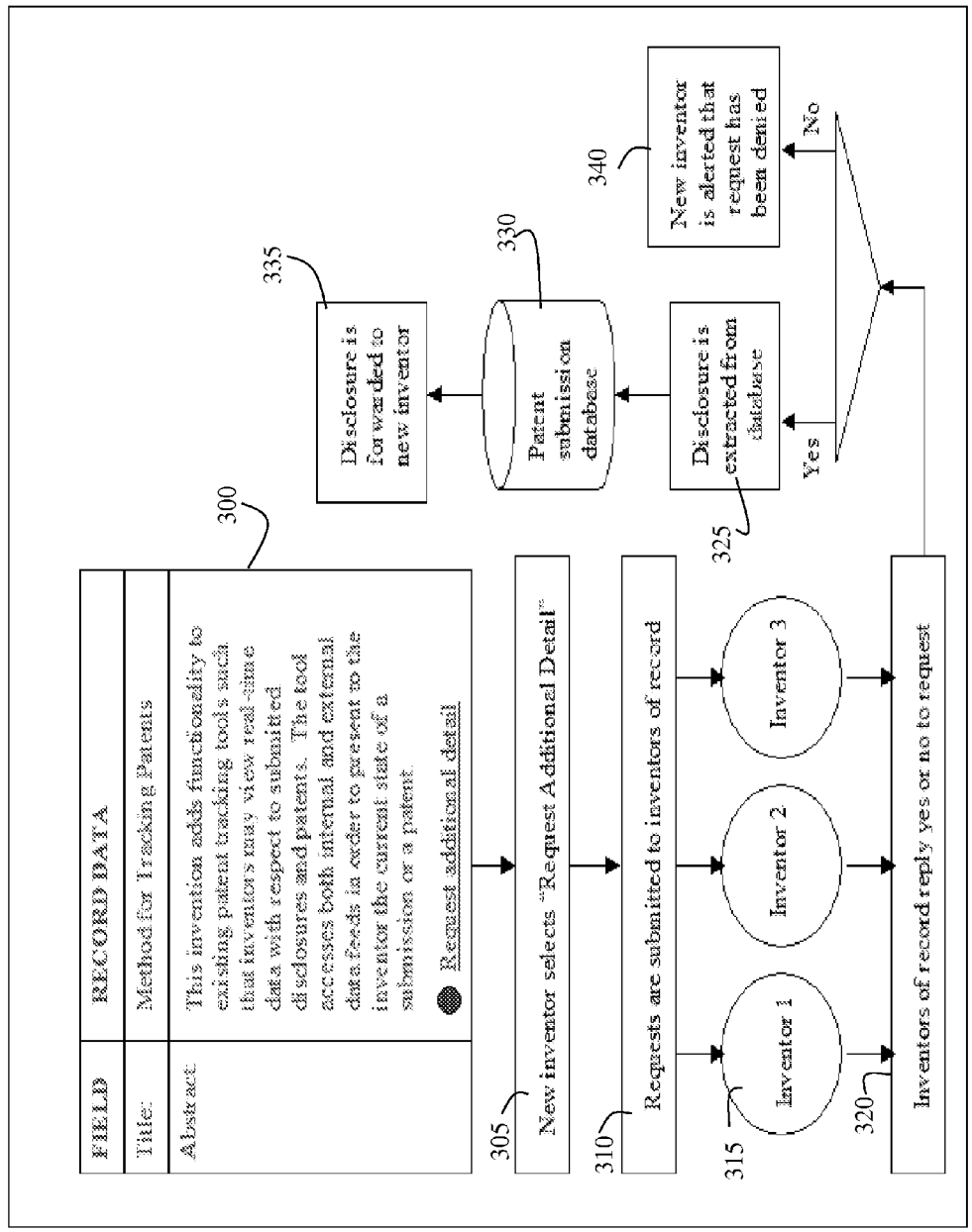
FIG. 3 is a flow diagram showing a process for requesting information in accordance with aspects of the present invention.

FIGS. 2 and 3 illustrate exemplary processes in accordance with the present invention. The steps of FIGS. 2 and 3 may be implemented on the computer infrastructure of FIG. 1, for example. The flow diagrams in FIGS. 2 and 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention is separated into two different flows. For example, the flow of FIG. 2 shows a process to request patent disclosure information from a database. FIG. 3, on the other hand, shows a process to obtain permission from one or more inventors to gain access to additional disclosure documentation, which may be considered confidential.

Referring to FIG. 2, in embodiments, the system and method includes fields that are to be completed prior to enabling access to the remainder of the tool in order to prepare a patent disclosure. In the example, the potential inventor may type a title such as "System for Patent Tracking" (terms), and based on entering that title, may be presented with the title and abstract of preexisting disclosures such as, for example, entitled "Method for Tracking Patents" and "Patent Writing Tool and Tracker". This allows the potential inventor to determine whether or not to continue the preparation of a new disclosure. In one embodiment, both the title and abstract fields would be parsed for matching words, terms, and the like, where in another embodiment only the title or the abstract would be parsed for matching words, terms, and the like.

More specifically, at step 200, the inventor opens the tool of the present invention. At this stage, a display will be presented to the inventor which includes fillable fields such as, for example, "title" and "abstract" or other desired sections of non-public proprietary information associated with an innovation already stored in a database. The inventor will complete one or both of these fields. At steps 205 and 210, the computer control parse any combination of the title and abstract fields with disclosures existing in the database. At step 215, matches are identified and the titles are presented to the inventor. In embodiments, the titles can be presented in a tabular format as shown at step 220. At step 225, the inventor selects a disclosure to review. At step 230, the program control retrieves the tile and/or abstract and presents this limited information to the inventor at step 235. The retrieved information can show what is or is not overlapping with a current disclosure. In this way, it is possible to provide the inventor with real time alerts about potential overlapping material, conflicts, etc. using a patent disclosure tracking tool.

In FIG. 3, in the event that the preexisting titles and abstracts do not provide sufficient detail for the potential inventor to determine whether overlap exists, the present invention introduces an additional feature that allows the inventor to request additional disclosure data. For example, in embodiments, a link to request additional data can be provided such that further disclosure records can be presented to the new inventor. By clicking a mouse or otherwise selecting this feature, a message would be sent to the inventors of record (or other third party) for the preexisting disclosure asking permission for the new inventor to view additional disclosure data.

More specifically, at step 300, the inventor is presented with the initially matched information, similar to that displayed in step 235 of FIG. 3. At step 305, the inventor selects a displayed icon, pull down menu, etc. requesting additional information. For example, an icon or pull down menu may include the language, for example, "Request Additional Detail" or similar language. In embodiments, when the inventor activates the "Request Additional Detail" feature, a secondary pop-up box would be displayed and would list all of the possible sections of the disclosure that are a part of the preexisting disclosure. An example of such sections might include the following:

Title
Abstract
Preferred Embodiment / Invention Detail
Alternate Embodiments
Tables and Figures
Claims The requesting inventor could select one or more of the sections that they would like to view, after which, a request detailing the desired sections would be sent to the inventors of record.

At step 310, the program control finds and retrieves the inventor(s) contact information from, for example, the database and, at step 315, sends a message to the inventors of record. In embodiments, program control can retrieve and contact any number of the inventors of record (or authorized third parties). At step 320, the inventor(s) of record reply to the request to seek additional information. This reply may be in the form of a "yes" or "no" response. In embodiments, any individual inventor of record could grant the right to view the requested data,
a majority would be required, and/or
all inventors of record may be required to approve the request.

If the inventor(s) reply yes, the program control will extract or retrieve the requested information from the database at steps 325 and 330. The extracted disclosure information will then be forwarded to the requesting inventor at step 335. The extracted information can show what is or is not overlapping with a current disclosure. In this way, again, it is possible to provide the inventor with real time alerts about potential overlapping material, conflicts, etc. using a patent disclosure tracking tool.

In embodiments, the inventors can authorize any combination of sections for viewing. As an example, the inventors of record may permit the requesting inventor to view the preferred embodiment and the tables and figures, but may deny the access to the claims. If the inventor(s) do not provide authorization to view the disclosure, at step 340, the requesting inventor is alerted that the request has been denied.

In embodiments, the request could be sent to outside counsel, in house counsel or third party arbitrator of record rather than the inventors of record. In yet another embodiment, the request could be sent to the inventors first, and if the requestor is denied access then an appeal would be sent to the outside counsel, in house counsel or third party arbitrator of record. The arbitrator of record could be a neutral third party, such as a Patent Engineer, that would access the requested disclosure data and assist the requesting inventor in determining what, if any, overlap exists with the new idea.

In further embodiments, the inventors or third party (such as, for example, outside counsel, in house counsel or third party arbitrator of record) may provide summaries or condensations of actual text within a nascent or mature disclosure, which others (e.g. other potential inventors) may access upon request. In this manner, sensitive material may be restricted while still allowing others to understand the general thrust or gist of a section of a disclosure. For example, an artificial agent may be able to extract the general topic of a paragraph by an analysis of keywords without revealing all of the text.

Metadata may be used within a disclosure to indicate possible prior art sections, references, or other material. These sections may be accessed by other inventors (even if these other inventors may not be able to view the actual contents of the disclosure) in order to better understand: possible prior art for their own invention, perform an invention gap analysis, or for other purposes. Metadata may be associated with each section, sentence, word, or paragraph such that the system may parse this metadata to understand the sensitivity or access characteristics of these sections. Metadata may also be used to specify what degree of maturity a section is in, e.g., if the invention is still under construction. For example, an inventor may tag a section as "complete" or as "in progress." Metadata may also be used to indicate which diagrams (or any section) are offered by inventors for reuse by others. For example, an inventor may have a diagram of a system such as a mainframe that is likely to have reuse value. The inventor may tag this diagram to indicate that this figure is reusable in other disclosures.

In further embodiments, the metadata may also be used to specify a request for help by a new inventor. For example, if the embodiment section has a paragraph that needs expert help to complete, this may be tagged and interrogated by the system. This facilitates collaboration and the efficient creation of high-quality inventions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method implemented on a computer infrastructure, comprising:
   storing, by a computing device, disclosure information related to non-public proprietary innovation;
   receiving, by a computing device, terms associated with an innovation;
   matching, by a computing device, the terms with at least one section of the stored disclosure information;
   providing, by a computing device, an alert to a user that certain terms out of the terms associated with the innovation overlap with the stored disclosure information based on the matching;
   providing, by a computing device, a request to the user for requesting additional disclosure data from inventors of the stored disclosure information;
   providing, by a computing device, an alert to the user of a denial of the request;
   providing, by a computing device, an appeal to the user for appealing the request denial to another party; and
   providing, by a computing device, an artificial agent to extract a general topic out of the at least one section of the stored disclosure information without revealing all of a text of the at least one section of the stored disclosure information,
   wherein the disclosure information includes metadata that: indicates prior art; separates sections of the disclosure information; specifies a degree of maturity of sections; and indicates which sections are offered by inventors for reuse by others.

2. The method of claim 1, wherein the matching the terms with the stored disclosure information includes parsing information related to at least one of a title and an abstract of the disclosure information.

3. The method of claim 1, wherein the alert for overlap includes progressively displaying sections of disclosure information which overlaps with the terms.

4. The method of claim 3, wherein the sections include at least one of a title and an abstract of the disclosure information.

5. The method of claim 1, further comprising providing the user with fillable fields for at least one of a title and an abstract for entering of the terms.

6. The method of claim 1, further comprising receiving a request for additional information related to the overlap with the stored disclosure information.

7. The method of claim 6, further comprising determining one or more inventors associated with the stored disclosure information that overlap with the terms and sending the one or more inventors a request for the additional information.

8. The method of claim 7, further comprising receiving authorization from at least one of the one or more inventors to view all or portions of the additional information and extracting the all or portions of the additional invention for presenting to the user.

9. The method of claim 7, further comprising receiving authorization from each of the one or more inventors to view all or portions of the additional information and extracting the all or portions of the additional invention for presenting to the user.

10. The method of claim 7, wherein the additional information includes: preferred embodiment/invention detail; alternate embodiments; tables; figures and claims.

11. The method of claim 10, further comprising sending a request for the additional information to one or more third parties and at one of: receiving authorization to view all or portions of the additional information and sending summaries of the additional information.

12. The method of claim 11, further comprising inserting metadata to: separate sections of the disclosure information; designated complete or in progress sections; and indicated sections which are offered by inventors for reuse by others.

13. The method of claim 1, wherein the computing infrastructure is at least one of maintained, deployed, created and supported by a service provider.

14. The method of claim 1, wherein the steps are provided on a software component, a hardware component or a combination of the software component and the hardware component.

15. The method of claim 1, wherein the metadata further comprises an invention gap analysis; a designation that a section is complete or is in progress; and diagrams offered by the inventors for reuse by others.

16. A computer program product comprising a computer readable hardware storage device having readable program code stored on the computer readable hardware storage device, the program code comprising:
   program code to store disclosure information related to non-public proprietary innovation;
   program code to receive terms associated with an innovation;
   program code to match the terms with at least one section of the stored disclosure information; and
   program code to provide an alert to a user that certain terms out of the terms associated with the innovation overlap with the stored disclosure information based on the matching;
   program code to provide a request to the user for requesting additional disclosure data from inventors of the stored disclosure information;
   program code to provide an alert to the user of a denial of the request;
   program code to provide an appeal to the user for appealing the request denial to another party; and
   program code to provide an artificial agent to extract a general topic out of the at least one section of the stored disclosure information without revealing all of a text of the at least one section of the stored disclosure information,
   wherein the disclosure information includes metadata that: indicates prior art; separates sections of the disclosure information; specifies a degree of maturity of sections; and indicates which sections are offered by inventors for reuse by others.

17. The computer program product of claim 16, wherein the appeal is sent to a third party arbitrator of record, the arbitrator accessing the requested additional disclosure data and assisting the user in determining if any overlap exists.

18. A system, comprising:
   a computer device comprising a processor;
   a computer readable hardware storage device; and
   computing instructions stored on the computer readable hardware storage device that, when executed by the processor, cause the computer device to:
   store disclosure information related to non-public proprietary innovation;
   receive terms associated with an innovation;
   match the terms with at least one section of the stored disclosure information;
   provide an alert to a user that certain terms out of the terms associated with the innovation overlap with the stored disclosure information based on the matching;

provide a request to the user for requesting additional disclosure data from inventors of the stored disclosure information;

provide an alert to the user of a denial of the request;

provide an appeal to the user for appealing the request denial to another party; and provide an artificial agent to extract a general topic out of the at least one section of the stored disclosure information without revealing all of a text of the at least one section of the stored disclosure information, wherein the disclosure information includes metadata that: indicates prior art; separates sections of the disclosure information; specifies a degree of maturity of sections; and indicates which sections are offered by inventors for reuse by others.

19. The system of claim 18, wherein the metadata is used to specify a request for help by the user if the at least one section of the stored disclosure information has a paragraph which needs help to complete.

\* \* \* \* \*